Oct. 15, 1963 P. R. BRILES 3,106,862
HIGH TORQUE FASTENER
Filed Dec. 3, 1962
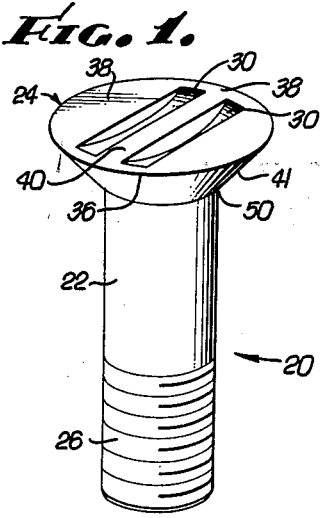
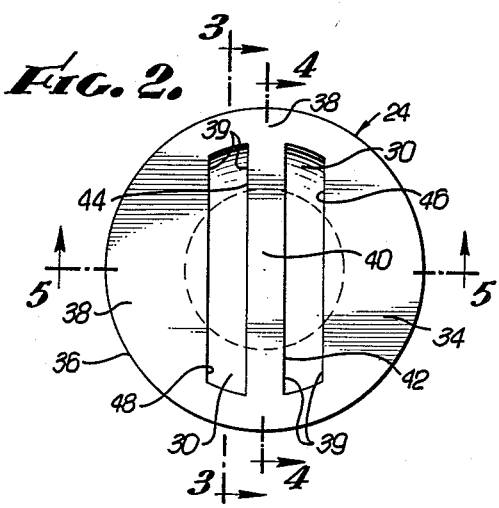
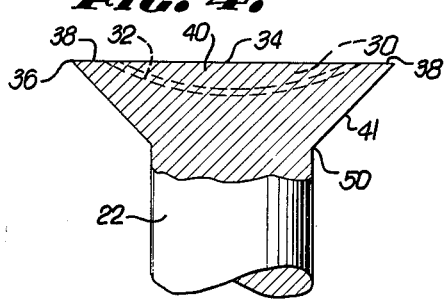
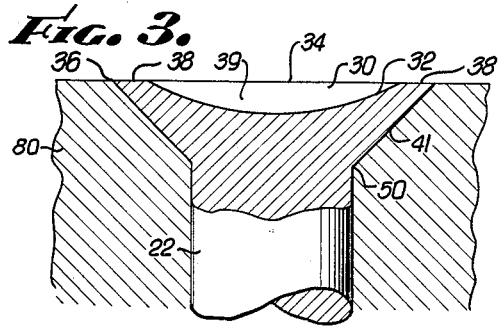
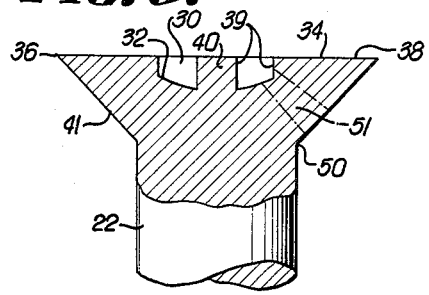
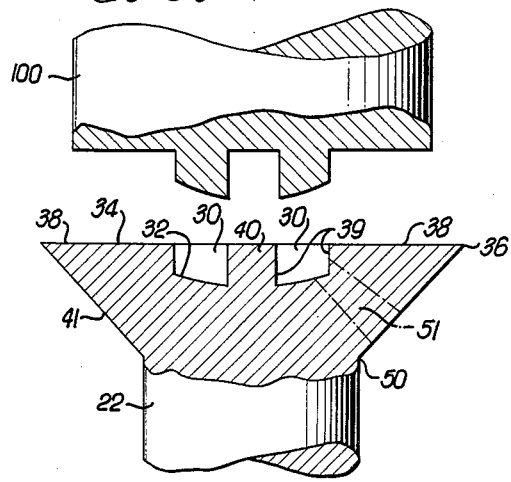
INVENTOR.
PAUL R. BRILES
BY
Huebner & Worrel
ATTORNEYS.

ion entitled High Torque Fastener, Serial No. 191,678, filed April 24, 1962, now abandoned, which in turn was a continuation of an application entitled High Torque Fastener, Serial No. 753,561, filed August 6, 1958, now abandoned.

United States Patent Office 3,106,862
Patented Oct. 15, 1963

3,106,862
HIGH TORQUE FASTENER
Paul R. Briles, Inglewood, Calif., assignor to Briles Manufacturing, El Segundo, Calif., a partnership consisting of Paul R. Briles, Inc., and Franklin S. Briles, Inc.
Filed Dec. 3, 1962, Ser. No. 241,837
3 Claims. (Cl. 85—45)

This invention relates generally to a high strength recessed head bolt, screw, or the like. More specifically, the invention also relates to a novel recessed head bolt, or the like, having such configurations and metallurgical characteristics as to be capable of sustaining extremely high turning-in torque and turning-out torque without damage to the bolt, and to a recessed head bolt capable of developing tensile fatigue endurance to a level substantially higher than that evidenced by recessed head bolts of the prior art.

This application is a continuation-in-part of an application entitled High Torque Fastener, Serial No. 191,678, filed April 24, 1962, now abandoned, which in turn was a continuation of an application entitled High Torque Fastener, Serial No. 753,561, filed August 6, 1958, now abandoned.

There are two main types of high strength bolts, the term "high strength" being used herein to denote a bolt having a high torque loading capability and a high fatigue endurance level. These are the transverse recess head type, and the central recess type. One important and inherent difference between a transverse recess type of bolt and a central recess type of bolt resides in the fact that the mechanical advantage that can be applied to the transverse recess bolt in torquing it up is substantially greater than that obtainable in torquing up a central recess bolt. By the same token, the unit area of any given torque loading on the transverse recess walls is greatly reduced, in comparison with the same torque loading on a central recess bolt. Consequently, the likelihood of failure of the transverse recess bolt, by extrusion, by shearing of the head material around the recess, by the formation of work-hardened regions, or the setting up of local stress patterns, is greatly reduced.

I am aware of many types of prior art transverse recess bolts; however, all of these bolts, without exception, either are incapable of being torqued-up to exceedingly high values or do not have high fatigue characteristics. One of the most prevalent reasons for the inadequacy of the prior art transverse recess bolts undergoing high torque loading is that the material structure surrounding and below the transverse recess or recesses (generally referred to herein as the head or rim and bridge material) is insufficient, either in terms of amount of material or in terms of grain structure, or both. Therefore, the shear material cannot withstand the tendency to deformation or deflection. By deepening the recess conformation to provide an adequate seating for the torquing tool, so as to develop the requisite pressure without damage to the bolt head, the amount of head material must further be decreased. Thus, in a real sense, the requirement of adequate seating for a torquing tool and the requirement of a sufficiently massive head structure are incompatible.

Bearing in mind the foregoing facts, it is a major object of my invention to provide a transverse recess both having high torque loading, high fatigue characteristics superior to the transverse recess bolts of the prior art.

It is another major object of my invention to provide a bolt with a recess configuration such that the remaining head material, both that surrounding the recesses and that below the recesses, will be sufficiently massive and so distributed as to provide resistance against head deflection under extreme loading of the bolt.

A further object of my present invention is to provide a cold-headed transverse recess bolt, or the like, having a plurality of torque loading areas, the material surrounding and below the recesses and adjacent the torque loading areas being of sufficient amount to withstand extreme torque loading.

Yet another object in general of the invention is to provide a recess head bolt having a structure such as to compensate to a very substantial degree for the "notch effect" of the recess edges which pass in proximity to the region of ultimate failure under tensile fatigue loading, and to provide a bolt of the type described in which there is a strengthening of the regions which would otherwise be the weakest part of the bolt under tensile fatigue loading, whereby to increase the fatigue limit of the bolt under such loading.

The bolt of my invention is characterized by the presence of a pair of transverse recesses, equally spaced on the two sides of the shank axis, each of the recesses having an arcuate bottom or floor which intersects the bolt head surface a distance inwardly from the edge thereof. These arcuate bottoms of the recesses define portions of a common cylindrical surface, which thus provide additional integral torque loading strength, and additionally, the recesses have parallel side walls, there being a bridge conformation remaining between the recesses in which the bridge is continuous with the structure of the continuous peripheral edge of the bolt head. One object of such construction is to provide, in combination with other features, a bolt in which a substantial portion of the torque loading thereon is transmitted from the torque loading areas to the bolt shank through the bridge, and under the recess floors, thus, to a very substantial degree, by-passing the region of ultimate tensile fatigue fracture.

It is a further object of my invention to provide parallel recess walls for said bolt which fit together with a wrenching tool in such close dimensional tolerances that the initial loading is at the extreme ends of the recessed walls where they taper to zero, with the loading spreading inwardly towards the center of the recesses as the torque increases, whereby to cause adequate engagement between wrench fingers and recess walls to sustain maximum loading. The fact, well established by numerous tests, that, in my bolt, torque loading of such magnitude as to fully and safely develop the full strength of the bolt with respect to all other strength characteristics, may be imposed on the walls of recesses of this type by reducing dimensional tolerances between wrench fingers and recess walls, is completely unexpected from the teaching of the art.

By my invention I am able to shorten and shallow the recesses, whereby to permit the retention of such massive rim formation as to substantially reduce to zero the possibility of head deflection which would pinch the recess walls and prevent the withdrawal of the wrench after set-up, or prevent the re-entry of a wrench into bolts which have been in service.

This further permits the retention of bolt sections around the critical central head region not possible in bolts designed according to prior art concepts. It is to be noted that these ends are consistent with and are further served by the substitution of the double recess for the single recess which provides double the usual number of torque loading points.

By substituting two shallow recesses, spaced from each other on two sides of the bolt axis, the mechanical advantage of under-head loading in its tendency to collapse the head around the recess long dimension is greatly reduced.

A still further advantage flowing from the provision of head formation of extraordinary rigidity flows from the fact that possible stresses at the fillet between head undersurface and shank, which would be especially serious in being cumulative with tensile fatigue stresses, are virtually eliminated.

Another object of my invention is to provide a recess construction such that any damage which might be done to the bolt by careless workmanship while turning it in or while releasing it from the work is imposed on regions of the bolt which are remote from the critical region of the head which sustains fatigue loading in service. A further object in this connection is to provide a recess construction in which the work hardening effect of torque loading as the bolt is turned in is imposed on regions different from and spaced away from those regions which are similarly loaded when the bolt is turned out, whereby a bolt which may be damaged in setting in may be removed with little difficulty by reverse application of the torquing tool to turn it out. It is noted in this connection that any possible work hardening of the material produced while in-torquing is non-cumulative with respect to out-torque loading, and non-cumulative with respect to such work hardening as occurs consequent to tensile fatigue loading.

Still another object of the invention is to provide a recessed head bolt having recess formations such that any damage which might be done to the recess walls by the use of improper wrenching tools, or by careless handling of the tools will be immediately evidenced to sight or touch by extrusion of material from the recess walls to the bolt head surface. In this respect, my bolt comprises an important improvement over central recess head bolts of the prior art in which bolt wrenching damage occurs to wall surfaces deep in the recesses in the heart of the bolt in immediate proximity to the working fibers and the region through which passes the fracture surface under tensile fatigue or tensile failure. In such bolts, such damage is difficult, and often virtually impossible to detect, and is readily concealed if a mastic filling is used to fill the recesses in bolts, as is used in aircraft construction where the bolt head may be exposed to air stream to smooth the surface. Such damage is particularly serious in that it occurs in the final stage of assembly after the parts have been inspected, is dependent on the human factor, and, unless seen, is beyond detection by inspection.

Yet another object of the present invention is to provide a novel recess configuration in my bolt whereby any displacement of the head, due to fatigue loading, is resisted, to an appreciable degree, by the walls of the countersink in the workpiece in which the head of the bolt is mounted, thereby increasing the effective fatigue limit of the bolt.

A further object of the present invention is to provide recesses which have arcuate bottoms or floors not only defining portions of a common cylindrical surface arced in the same direction as the direction of the bridge conformation between the recesses, but also defining a common cylindrical surface arced transversely to said bridge conformation and interrupted by the bridge conformation, so that such transverse common cylindrical surface follows generally the frusto-conical underhead surface of the bolt so as to maintain a substantial mass of material between said recesses and said frusto-conical underhead surface of the bolt along the entire transverse surfaces of the recesses, eliminating structural weaknesses in that area which would otherwise be present if the bottoms or floors of the recesses were transversely flat.

These and other objects of my invention will be clearly understood by referring to the following description, and to the accompanying drawings and photographs, in which:

FIGURE 1 is a perspective view of my novel bolt.

FIGURE 2 is a plan view of my bolt.

FIGURE 3 is a cross-sectional view of my bolt along the line 3—3 of FIGURE 2.

FIGURE 4 is a cross-sectional view of my bolt along the line 4—4 of FIGURE 2.

FIGURE 5 is a cross-sectional view of my bolt along the line 5—5 of FIGURE 2, shown mounted in work.

FIGURE 6 is a view similar to FIGURE 5, but showing (exploded) a wrenching tool to be used to apply torque to my bolt.

In the prior art of manufacturing transverse recess bolts it has been found that there is a great tendency of the head of such bolts to deflect or yield upwardly away from the work, to thereby tend to close the walls of the recess. As a consequence, the tools used to wrench up such bolts were provided with fingers considerably narrower than the recess openings to allow for this deflection. It was then found that the load which could be applied fell far short of that desired for high performance bolts, and according to the practice of the art, it was considered necessary to deepen the recess and elongate it to provide adequate surface area for the gripping of the wrenching tool. In fact, in many prior art bolts, the recess was made continuous across the entire top surface of the head. Such an approach meant a further reduction in the stock around the rim of the bolt and further weakening of the head.

However, quite contrary to what had been expected from such teachings in the art, I have found that by increasing the rim structure and providing a novel recessed head structure, the recesses may be both shortened and made shallower and sufficient stock left in the rim portion of the head to resist underhead forces of the magnitude which would be developed by tensioning the bolt shank to such value as to approach the thread strength or even approach the resistance of the bolt to twisting of the head from the shank.

As illustrated in the drawings, the bolt 20 of my invention has a shank 22 and an enlarged head 24, the shank usually, but not necessarily, having threads 26 formed thereon after the recess forming step. The head 24 of my novel bolt 20 is characterized by a pair of spaced transverse recesses 30, each of which recesses has an arcuate floor or bottom 32, the arc of which has a relatively large radius compared with the length of the recess measured at the top surface 34 of the head. Preferably, the ratio of the radius of the arc of the arcuate floor 32 to the recess length measured at the top surface of the head 24 is greater than one. The extreme shallowness of the recesses 30 thus formed, is thought to contribute greatly to the higher torque loading and high fatigue limits obtainable, as will be described in detail hereafter. These characteristic advantages are enhanced by the fact that the arcuate bottoms of the recesses define portions of a common cylindrical surface.

The arcuate floors 32 intersect the top surface 34 of the head 24, substantially inwardly of the peripheral edge 36 of said head, the end portion of said recesses 30 themselves being arced to conform to the arc of peripheral edge 36, thereby leaving a substantial rim structure 38 surrounding the outer portions of the recesses 30 to aid in preventing deflection during torque loading and to increase the fatigue value. In this connection, as well as in other respects, to be described, the parallel side walls 39 of the recesses 30 are extremely important, as this configuration allows a rim structure 38 of considerable massiveness to be formed. The rim structure 38 is bounded by the frusto-conical underhead surface 41. The rim structure 38 can be defined as having, in plan view, a pair of chordal segments on the sides of the recesses 30, and a pair of chordal segments lying at the ends of the recesses into which a bridge portion 40 extends, the ends of the chordal segments bearing end to end upon each other.

By spacing of the recesses 30 the bridge portion 40 is formed, which merges, both geometrically, and in terms of continuity of grain structure with the rim structure of material 38, and merges, both geometrically and in terms of continuity of grain structure with the shank 22 of the bolt 20. The bridge 40 is an essential portion of the bolt because it provides parallel torquing surfaces 42 and 44, in addition to torquing surfaces 46 and 48 (when the bolt is torqued up in a clockwise direction). The material behind the torquing surfaces 42 and 44 on the bridge 40 resists deflection, under extremely high torque loading, apparently because of its integrated association in terms of grain structure with the rim structure 38 and the bolt shank 22.

In torque loading, a considerable portion of the torque load is transmitted from the ends of the recesses 30 through the bridge 40 to the bolt shank 22, thereby avoiding the critical region of tensile fatigue loading between the floor 32 of the recesses 30 and the lateral portion of the fillet 50. The approximate critical region is indicated by the dotted area 51 in FIGURE 5. It is thought that the particular grain structure brought out by the particular double recess configuration in my bolt 20 is at least one reason that the high torque loading and high fatigue limits are obtained.

Additionally, the floors or bottoms 32 of the recesses 30 also define a common cylindrical surface arced transversely to and interrupted by the bridge 40, said common transverse cylindrical surface following generally the frusto-conical underhead surface 41 of bolt 20 and being spaced apart therefrom, so that areas of critical weakness between recesses 30 and underhead surface 41 are avoided in the critical area 51 and a substantial mass of material is present throughout said critical area 51.

The advantage of the above noted features with respect to tensile fatigue endurance of my bolt 20 has several other important aspects. Firstly, it is to be noted that any deflection or yield in the head 24 of the bolt away from the countersink surface 53 of the work 80 in which it is mounted, due to the torque loading, would be reflected in the stressing condition of the fillet 50 which would be cumulative to the stress developed by the tensile load and tensile fatigue. The absence of such stress at the fillet 50, which substantially eliminates such deflection, contributes to the over-all fatigue endurance of the bolt 20.

Secondly, the stresses transmitted from the torque loading surfaces 42, 44, 46 and 48 to the bolt shank 22 are widely diffused, besides being directed to a substantial degree through the bridge 40, thereby reducing the unit area stress in the most critical region 51 of tensile fatigue loading between the bottom outer edge 55 of the recess 30 and the fillet 50.

Thirdly, all localized stressing and work hardening which might occur from torque loading is confined to regions far removed from this critical tensile fatigue strain resisting region.

In addition, it is to be noted that the regions of the material which receive the in-torque loading 42, 44, 46 and 48, are separated from the region of the material which receives the out-torque loading, thus limiting any possible cumulative strain therebetween, or any reflection, however remote, to the critical region of tensile fatigue loading.

In this connection it is to be noted that in contrast to what occurs in the case of central recess bolts, if a mechanic by carelessness in the use of the wrong wrench should damage the transverse recess walls 39 in setting up my bolt 20, or loads the bolt excessively, the out-torque receiving surfaces remain in good condition to enable him to remove the bolt for replacement. In the central recess type of bolt, the in-torque and out-torque regions being in immediate proximity, damage to one set of surfaces usually results in damage to the other, rendering it difficult or often impossible to turn the bolt up without cutting out the work piece. In the bolt of the present invention, resistance to tensile fatigue loading thus is relatively independent of the personal factor of the mechanic in setting the bolt in the work and considerably less scatter of service and test results is obtained.

It will thus be seen that, by providing four torque loading surfaces, together with an integral bridge and massive rim structure, a highly improved, high torque, high fatigue bolt is provided.

As previously mentioned, the wrenching tools of the prior art necessarily were provided with fingers considerably narrower than the recess openings to allow for the deflection or closing of the walls of the recess during torque loading. However, by providing the particular recess formation 30, and rim and bridge structure 38 and 40, the deflection of the recess walls 39 during high torque loading is substantially eliminated.

The fact that recess wall failure is substantially absent in my bolt 20, is evident by the fact that until the load imposed reaches the destruction point of the bolt in other respects, the outthrust of the wrench 100 (shown in FIGURE 6) from the recess, such as might be due to any yield of the walls 39 under the wrench fingers, is substantially zero. This last result is of the utmost importance in the use of such bolts in the construction such as that of air frames in which the physical effort called for upon the part of the mechanic to hold the wrench in against outthrust introduces the uncertainty of the human element.

A complete explanation for the great compressive strength of the recess ends, when undergoing extremely high loadings during the initial instant of loading (because of the close tolerances of tool and recess wall, and the configuration of the recess wall) is believed to involve a phenomenon analagous to that which has been known to exist in the case of the condition of metal at the thread roots in cylindrical pieces being subjected to the thread rolling operation. In such operations it is known that the yield point strength may be defined as a stress in pounds per square inch beyond which the material will undergo permanent or plastic deformation. The yield point commonly reported is that obtained from standardized tensile tests. In the case of the compression of cylindrical bars of length equal to two or three times the diameter, the compressive yield point is very nearly the same as that obtained from standard tensile tests. However, in the case of localized compression between surfaces, where the contact area is relatively small compared to the total surface area, the resistance to permanent or plastic deformation may reach several times the magnitude of tensile yield point. This resistance to compression may even reach values several times the ultimate tensile strength.

While my invention is not dependent upon the verity of the theory here advanced, it is believed that an analogous phenomenon is here involved in the condition of the material at the ends of the recess 30 where the imposed load appears to reach an almost infinite value instantaneously locally at the ends of the recess walls until, by a type of elastic yield, the load bearing area is spread inwardly from the recess ends without failure of the recess walls 39. It is probably because of this phenomenon that I have been successful in making my recesses shallower than is the practice in transverse recess bolts, whereby a body of material has been permitted to remain in the axial region under the recesses sufficient to provide material to resist the high fatigue loads which this bolt has been found, in practice, to develop. The advantage which has been hoped for in transverse recess head bolts which flows from the long mechanical advantage of the lever arm thus effected, is realized to the full in my bolt 20, thus reducing unit area loading as well as the unit volume stressing, and reducing the probability of work hardening, particularly in the critical region 51 of tensile fatigue failure due to the application of extreme high unit area torque loading.

Turning specifically to my parallel walled recess 30, the simplicity of the relatively large radius arc of the floor 32 of the recess enables it to be readily filled with mastic in the case of its use in airframe construction thereby readily to provide a smooth surface against the air stream. Further, and even more important, the recesses 30 can be readily cleaned out with a simple tool (not shown) to completely evacuate the mastic material. The parallel walled, arcuate bottomed recess 30 also permits such cleaning to provide firm and full seating of a wrench to remove the bolt 20 from the work.

Because of the shallowness of the recess, and also because the bolt 20 is usually (but not necessarily) designed to fail in the recesses due to excessive torque loading, any damage which may be done to the bolt 20 by abuse in the use of the wrench, or by the use of the wrong type of wrench, or by excessive loading, consists of extrusion of the material of the wall outwardly and upwardly to the surfaces of the head 24, where it is impossible of concealment by mastic filling and may be detected quickly by sight, and unavoidably by touch, in the case of bolts which are in position difficult to be seen. In the case of aircraft construction, the ready visualization of the torque loading failure is of the utmost importance because, by the time the bolt is installed in the work, the possibility of discovering damage done by poor workmanship is very slight and defects may easily escape detection into use, and be the cause of serious accidents. The out-torquing surfaces remain untouched, enabling the bolt 20 to be readily withdrawn from the work.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

I claim:

1. A bolt which comprises: a cylindrical shank; a head on said shank, said head having a flat-topped surface, and said head having a pair of parallel, spaced, arcuate-bottomed recesses opening to said flat-topped surface, said recesses having four parallel side walls all of which are perpendicular to said flat-topped surface, the ends of each of said recesses being disposed inwardly a substantial distance from the periphery of said flat-topped surface, whereby said recesses are surrounded by a continuous ring of material of substantial mass, said recesses being disposed equal distances from and on opposite sides of the longitudinal axis of said bolt so as to define a continuous bridge between said recesses, said bridge between said recesses being integral at its ends with said continuous ring of material, the head conformation around said recesses comprising a pair of chordal segments on the sides of the recesses, and a pair of chordal segments lying at the ends of the recesses into which said bridge extends, said chordal segments bearing end to end against each other as a ring of segments around the head rim; the ratio of radius of the arc of the arcuate bottom of each recess to the length of said recess, measured at said flat-topped surface, being greater than one; and the bottom of said recesses being arced transversely to said bridge.

2. A bolt as defined in claim 1, wherein said head is of frusto-conical configuration, and wherein said head has a substantial mass of material surrounding the bottom and sides of said recesses.

3. A bolt as defined in claim 1, wherein the arcuate bottoms of said recesses define portions of a common cylindrical surface, and wherein the transverse arc of the bottoms of said recesses define a common transverse cylindrical surface interrupted by said bridge.

References Cited in the file of this patent
UNITED STATES PATENTS

| | | |
|---|---|---|
| 218,142 | Schowe | Aug. 5, 1879 |
| 255,459 | Rogers | Mar. 28, 1882 |
| 847,774 | Hoffman | Mar. 19, 1907 |
| 2,182,568 | Olson | Dec. 5, 1939 |
| 2,304,704 | O'Leary | Dec. 8, 1942 |
| 2,384,264 | Schlueter | Sept. 4, 1945 |